United States Patent
Tsaur et al.

(10) Patent No.: US 10,402,090 B1
(45) Date of Patent: Sep. 3, 2019

(54) DATA SERVICE PROTECTION FOR CLOUD MANAGEMENT PLATFORMS

(71) Applicant: EMC IP Holding Company LLC, Hopkinton, MA (US)

(72) Inventors: Ynn-Pyng Tsaur, San Jose, CA (US); Sameer Lokray, Santa Clara, CA (US); Biju Pillai, Sunnyvale, CA (US); Xiaoqiong Wu, Newark, CA (US); Peng Liu, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 288 days.

(21) Appl. No.: 15/281,331

(22) Filed: Sep. 30, 2016

(51) Int. Cl.
  *G06F 11/00* (2006.01)
  *G06F 3/06* (2006.01)
  *G06F 11/14* (2006.01)

(52) U.S. Cl.
  CPC .......... *G06F 3/0604* (2013.01); *G06F 3/065* (2013.01); *G06F 3/0619* (2013.01); *G06F 3/0649* (2013.01); *G06F 11/1451* (2013.01)

(58) Field of Classification Search
  CPC .... G06F 3/0604; G06F 3/0619; G06F 3/0649; G06F 3/065; G06F 3/067; G06F 11/1446; G06F 11/1448; G06F 11/1451; G06F 11/1458; G06F 11/1461; G06F 11/1464
  See application file for complete search history.

(56) References Cited

U.S. PATENT DOCUMENTS

| | | | | |
|---|---|---|---|---|
| 8,266,112 B1 * | 9/2012 | Beatty | ............... | G06F 11/1469 707/610 |
| 8,676,763 B2 * | 3/2014 | Goodman | ........... | G06F 11/1451 707/609 |
| 9,465,697 B2 * | 10/2016 | Robinson | ............ | G06F 11/1458 |
| 2011/0173405 A1 * | 7/2011 | Grabarnik | ........... | G06F 11/1464 711/162 |
| 2015/0089274 A1 * | 3/2015 | Mares | ................. | H04L 41/5041 714/4.11 |
| 2018/0060187 A1 * | 3/2018 | Chavda | ............... | G06F 11/1438 |
| 2018/0260282 A1 * | 9/2018 | Sinha | ................... | G06F 11/1451 |
| 2018/0267861 A1 * | 9/2018 | Iyer | ..................... | G06F 11/1451 |
| 2018/0285215 A1 * | 10/2018 | Ashraf | ............... | G06F 11/1469 |

* cited by examiner

*Primary Examiner* — Marc Duncan
(74) *Attorney, Agent, or Firm* — Staniford Tomita LLP

(57) ABSTRACT

A system and method for providing data protection services and lifecycle management in a Platform as a Service (PaaS) platform having cloud-based applications and data, by discovering an application installed on the PaaS platform using mechanisms native to the PaaS platform, associating the application and an associated data service used by the application to identify data created by the application, and performing a backup/restore operation on the application and the identified data in accordance with a defined schedule. The native mechanisms may comprise application programming interfaces (APIs) provided by the PaaS platform, or metadata associated with containers used by the PaaS platform. The schedule may be defined by RTO and RPO requirements of a user.

17 Claims, 4 Drawing Sheets

US 10,402,090 B1

DATA SERVICE PROTECTION FOR CLOUD MANAGEMENT PLATFORMS

TECHNICAL FIELD

Embodiments are generally directed to cloud management platforms, and more specifically to providing data service protection and lifecycle management for cloud applications and data.

BACKGROUND

Cloud computing provides shared computer processing resources and data on-demand to networked devices. It enables access to a shared pool of computing resources that can be rapidly provisioned and released with relatively little management overhead. Various different service models are defined for cloud computing, including Software as a Service (SaaS), Platform as a Service (PaaS), and Infrastructure as a Service (IaaS). The PaaS model allows users to deploy onto the cloud user-created applications using languages, libraries, and tools supported by the provider. PaaS vendors (providers) typically offer a development environment to application developers (users) by delivering a computing platform that includes an operating system, execution environment, database, and web server, among other components. The developers can then develop and test their applications without buying or managing these underlying computing resources. Many new applications are developed in the cloud hosted by PaaS technology, and popular providers include Cloud Foundry, OpenShift, Kubernetes and Mesos. Such companies generally provide the speed, simplicity and control to develop and deploy applications faster and easier for users. However, even though PaaS greatly simplifies and shortens the application/solution development and delivery, it still faces the same traditional challenges of data protection, especially in enterprise environments. Even worse, there is generally no data protection solution available for these new PaaS platforms.

Current cloud platform services and systems are generally not well geared toward present backup and data protection models. Enterprise-level and cloud platforms using PaaS platforms typically focus on container-based services. Under this model, these systems do not provide a traditional file system, but instead provide a backend data store, and applications subscribe to this service and provision resources from this data service. The backend database service stores applications states, and container technology is used to store multiple instances such that all states of the applications are kept inside persistent databases. Backup operations in cloud platforms back up entire infrastructures rather than individual data sets (e.g., files) or applications. In this situation, data lifecycle management systems cannot store different instances of the applications and their data. This problem is exacerbated by the fact that data retention requirements (e.g., RTO, RPO) are different for different types of data and applications. For example, individual files may be backed up, whereas a SQL database may be backed up monthly, but require hourly or continuous protection, while an Exchange server may have other backup and data protection requirements. Under PaaS systems, backup processes lose these lifecycle and data protection configurations since entire infrastructures are backed up rather than individual applications or data sets.

What is needed therefore, is a system that provides custom or granular data protection to PaaS platforms. What is further needed is a system that leverages container or PaaS platform technology to request data from data service providers to provide proper backup and protection based on appropriate lifecycle management requirements.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC and Cloud Foundry are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
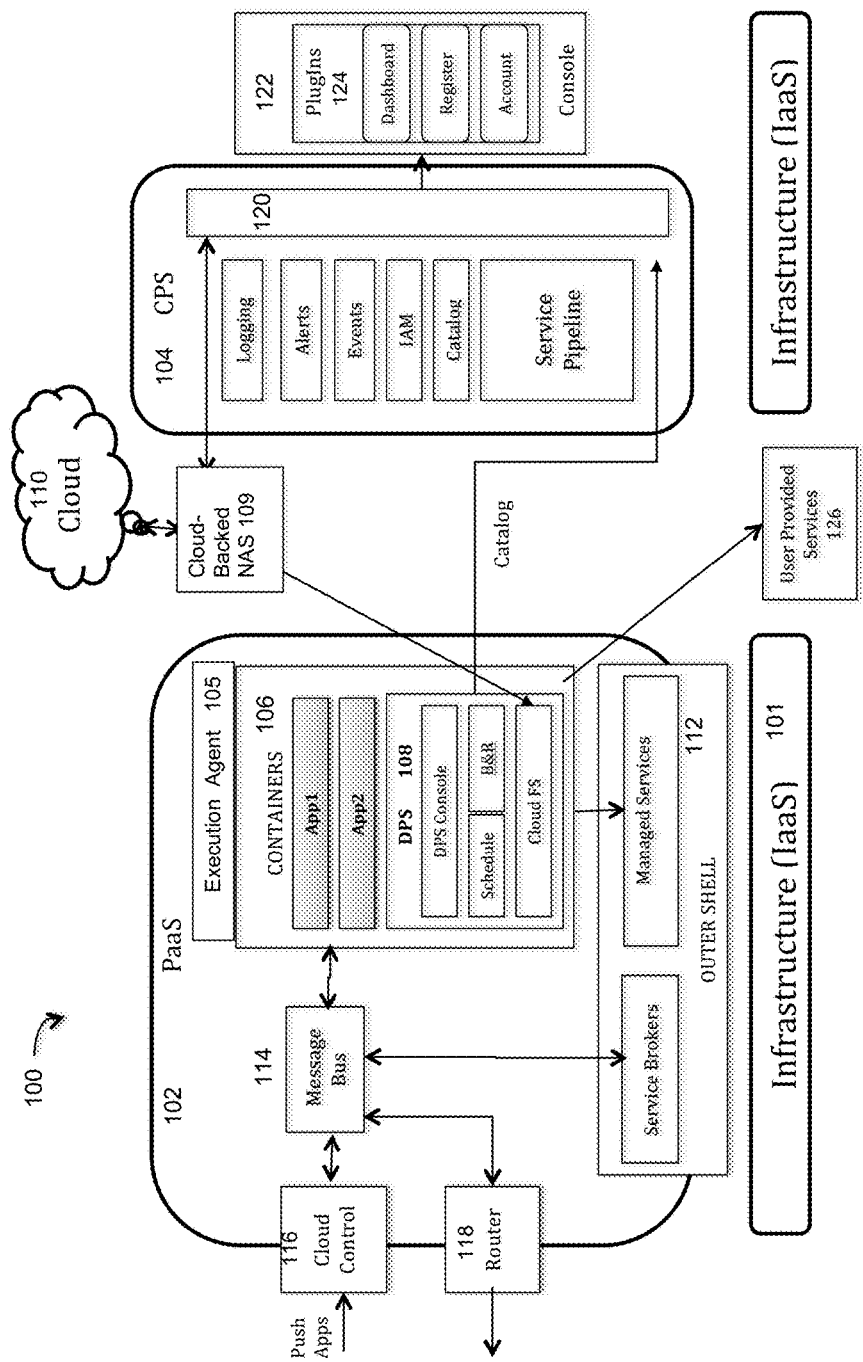
FIG. 1 illustrates a PaaS system that implements one or more embodiments of an application-centric lifecycle management and data protection service for cloud platforms.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve application-centric lifecycle management for cloud computing platforms or other very large-scale wide area networks (WANs), metropolitan area networks (MANs), though other distributed network topologies are also possible. Thus, aspects of the one or more embodiments described herein may be implemented on one or more computers executing software instructions, and the computers may be networked in a client-server arrangement or similar distributed computer network.

FIG. 1 illustrates a PaaS system that implements one or more embodiments of an application-centric lifecycle management and data protection service for cloud platforms. System 100 illustrates a PaaS platform 102 that deploys applications onto the cloud 110 infrastructure and runs above the Infrastructure as a Service (IaaS) layer 101. The PaaS platform 102 includes a number of functional components such as an execution agent 105 that manages containers 106. In an embodiment applications may be pushed or otherwise created or installed into the containers 106 through a cloud control module 116 and message bus 114. As shown in the example of FIG. 1, one of the containers 106 includes two applications denoted App1 and App2. The execution agent 105 stages the applications and runs them in the containers. With regard to staging, when a new application or a new version of an application is pushed to the PaaS platform, the cloud controller 116 selects an execution agent from the pool of available agents to stage the application. The execution agent then uses the appropriate build pack to stage the application. The execution agent 105 manages the lifecycle of each application instance running in it, starting and stopping the processes upon request of the cloud controller 116. It monitors the state of a started application instance, and periodically broadcasts application state messages over a lightweight publish-subscribe and distributed queuing messaging system 114 (e.g., NATS). In an embodiment, the cloud controller 116 provides REST API endpoints for clients to access the system, and it maintains a database with tables for organizations, spaces, services, user roles, and so on. The message bus 114 outputs http messages from the platform through router 118. The applications and message bus data also communicate to the IaaS layer 101 through an outer shell layer 112 that provides a tool chain for release engineering, deployment, and life-cycle management of large scale distributed services, among other functions. Accordingly, it may include components such as service brokers and managed services. The managed services may comprise data processing functions, such as database management systems (RDBMS), data structure stores, databases, cache and message brokers, and so on. Example managed services include MySQL, Redis, Cassandra, among others. The containers can also communicate directly to user provided services 126

For the embodiment of FIG. 1, system 100 includes a cloud platform system (CPS) 104 that provides a portfolio of integrated systems for virtualized operating system (e.g., Windows or Linux) workloads, facilitate migration to the cloud 110 for enterprises. The CPS 104 may include components or subsystems such as logging, alerts, events, IAM, catalog and service pipelines. It may also include a service gateway 120 that provides an interface to a user console 122 that certain plug-in components use, such as a dashboard, register, account, and other functional components.

In an embodiment of system 100, the PaaS platform 102 includes a data protection service 108 for the platform. DPS 108 includes a number of functional components including a DPS console, a scheduler, a backup/recovery component and a cloud file system (FS), among other possible components. The DPS 108 provides catalog data to the console 122 through the gateway 120. The cloud FS component communicates to the cloud 110 directly or through an NAS component 109, which in turn communicates to the console 122 through the service gateway 120. The NAS component 109 is utilized for a backup target storage service for when a virtual file system is a required backup target for data protection. For the example embodiment of FIG. 2, a cloud-backed NAS (network attached storage) component may be used.

The DPS 108 is configured to provide data protection to the applications (e.g., App1 and App2) and their respective data sets through the backup/recovery processes along with other life-cycle management functions. It performs this task at an application level so that individual applications and their data can be backed up, recovered, or otherwise managed individually instead of as part of the entire infrastructure as a whole. The DPS 108 leverages the specific container technology and PaaS platform type/configurations to automatically discover applications, find the associated data for the applications, and perform the appropriate data protection processes. This allows an automated or semi-automated process to intelligently protect and manage applications in the cloud independently of the infrastructure as a whole and thereby achieve lifecycle management functionalities that are provided by traditional enterprise-class data protection applications, but in the context of a PaaS platform.

In an embodiment, system 100 may include one or more network server computers that are coupled directly or indirectly to data sources, network storage, and other resources over network 110, which is shown as a cloud network, but may be a WAN or other appropriate network. Network 110 provides connectivity to the various systems, components, and resources of system 100, and may be implemented using protocols such as Fibre Channel (FC), Transmission Control Protocol (TCP) and/or Internet Protocol (IP), well known in the relevant arts. In a distributed network environment, system 100 represents a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application.

With respect to data protection, application data may be store in any appropriate type or number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices. To protect this data, a network server may execute a data backup/replication (B&R) process that periodically backs up the data for an application to other storage devices within an onsite or offsite data storage locations. Such locations may be data centers that may represent any type of computer network and associated data storage system, such as tape, magnetic disk, or solid-state disk storage devices arranged in any appropriate configuration, such as RAID arrays. The data centers may also represent virtual data centers representing a physical or virtual network of many virtual machines (VMs), such as on the order of thousands of VMs each. The data sourced by the data source may be any appropriate data, such as database data that is part of a database management system. In this case, the data may reside on one or more hard drives and may be stored in the database in a variety of formats (e.g., XML or RDMS).

The B&R process of system 100 may represent a data migration system that copies or replicates real or virtual machine processes running in the data centers from one physical data center to another data center located in another, often distant, geographic location. The data protection process may be used in conjunction with a continuous availability process or any appropriate backup process.

Figure 2:
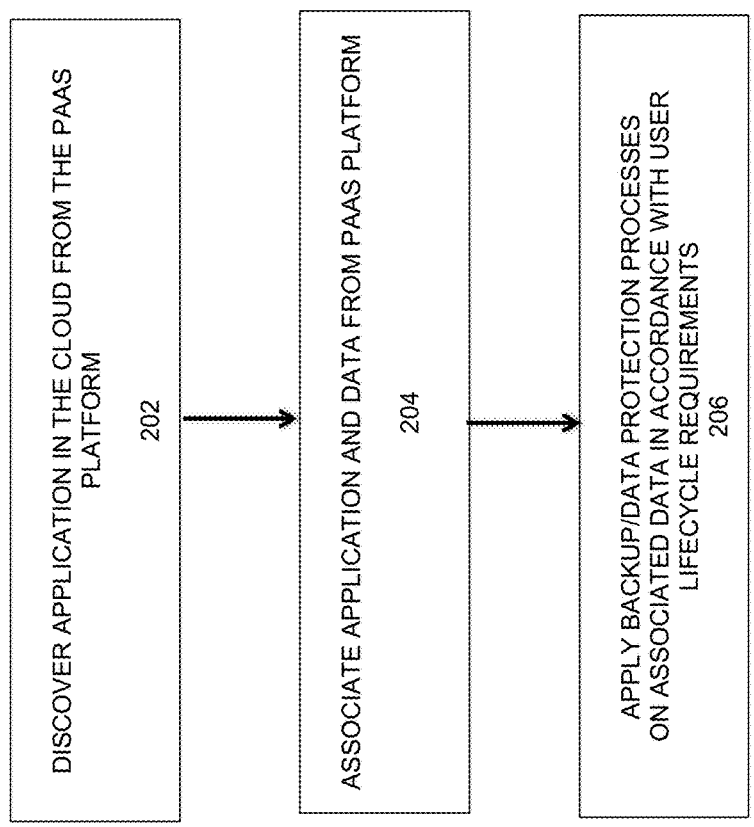
FIG. 2 is a flowchart that illustrates an overall process of providing a data protection and life-cycle management solution for cloud applications and their data on PaaS platforms, under some embodiments.

FIG. 2 is a flowchart that illustrates an overall process of providing a data protection (backup/recovery) and life-cycle management solution for cloud applications and their data on PaaS platforms, under some embodiments. FIG. 2 illustrates three main functional processes performed by DPS 108 under an embodiment. The process first discovers the relevant application or applications in the cloud, step 202. These applications are generally executed from within one or more of the containers 106, such as App1 and/or App2. The data created, used, generated, or otherwise processed by the application(s) may be stored in the container as well, or in a separate data store in the cloud or other networked storage, and may be organized by an appropriate file system or database convention/format. Although certain terms such as "application," "container" and "data set" may be referred to in the singular for the sake of brevity, it should be noted that such reference may include one or more instances and thus may refer to a plurality of such objects or instances.

During the discovery process, the DPS component 108 leverages certain functions or characteristics of the PaaS platform to determine which elements in the container are applications, and to identify the relevant application. For purposes of description, an example embodiment is described with respect to a PaaS platform that comprises a Cloud Foundry platform.

In general, applications deployed to Cloud Foundry access external resources through services. In a PaaS environment, all external dependencies such as databases, messaging systems, file systems and so on are services. When an application is pushed to Cloud Foundry (such as shown in FIG. 1), the services it should use also can be specified. Depending on the application language, auto-configuration of services is possible, for example a Java application requiring a MySQL database picks up the MySQL service on Cloud Foundry if it is the only one defined in the current space. Services are deployed to the platform first and then are available to any application using it.

Cloud Foundry itself provides well-defined APIs that define and expose relationships for the application, and are used by the DPS 108 to identify and application and establish its organization hierarchy. For example, in Cloud Foundry, the organization may be expressed as follows:

Organization→Space→Application→data services

Thus, for Cloud Foundry, the applications can be discovered by retrieval from the appropriate space, and the data services used by the application can be readily identified by the appropriate APIs or commands. The data to be protected through the backup/restore processes is thus identified through the data services that manage the data, such as the database management programs and/or the databases themselves. The appropriate data sets are located as indicated by the data services, and the appropriate backup/restore program is then used to move/copy/archive/restore the data as required by that program. Such data protection programs may be provided by plug-ins, and the backup processes may comprise any standard method, such as snapshot backups for data that is positively located or copy of particular data depending on the data service. The backup process may also be tailored based on any pre-processing that may be performed, for example, if a snapshot copy is already available, the backup procedure may comprise simply copying the snapshot to a location.

Other PaaS technologies, such as OpenShift may employ APIs or commands similar to Cloud Foundry, and hence their similar structures can be used in the application discovery step 202. Other technologies (e.g., Kubernetes) do not have such a hierarchy clearly defined. In this case, a hierarchy still can be established by various methods, such as by tagging or through analysis of container metadata.

With reference to FIG. 2, after the appropriate application is discovered, the DPS 108 associates the application and its data, step 204. This step analyzes the discovered data services used by the application and its data accesses. The data services may be the managed services and/or service brokers shown in the outer shell layer 112 of the PaaS platform. Again, using Cloud Foundry as an example embodiment of the PaaS platform 102, the Cloud foundry service broker provides a standard way of provisioning/binding each data service (e.g. MySQL, Cassandra, Redis, MongoDB, etc.) for each application. This provisioning/binding information is then used to obtain the data access information for the application. For example, a database connection string may indicate that a particular service is used by the application.

Once the application and associated data are identified through the data services, it is possible to apply the appropriate data protection and life-cycle management processes to this data alone and separately from other applications and/or the entire system infrastructure, even though it is still within the context of the PaaS platform containers 106. Thus, as shown in FIG. 2, the third main step of the process involves applying the appropriate backup/data protection processes on the data in accordance with the user lifecycle and protection requirements. The user may define certain RTO (recovery time objective) and RPO (recovery point objective) on the data. Such requirements were traditionally not capable of being applied on cloud data on an application basis on the PaaS platform. However, through the process of FIG. 2, an auto-discovery policy based data protection solution can be provided for cloud applications on PaaS platforms to satisfy an enterprise environment's data protection needs.

Any appropriate type of discovered application associated data may be protected, backed up, or managed. These include application binaries, application metadata, and data produced by an application through data services. With respect to the binaries, it is usually not absolutely necessary to backup application binary in PaaS, since it is static and generally will be stored in a protected repository. However, protecting such data may provide convenience from a recovery/restore perspective. The application metadata comprises metadata about application, its hierarchy relationship related to organization/spaces/other applications and data service and connection information. For the data produced by application through data services, protection/backup may be provided using various techniques, such as using a native database dump/backup tool, PaaS/IaaS/Storage-level snapshot techniques, and other similar methods.

Figure 3:
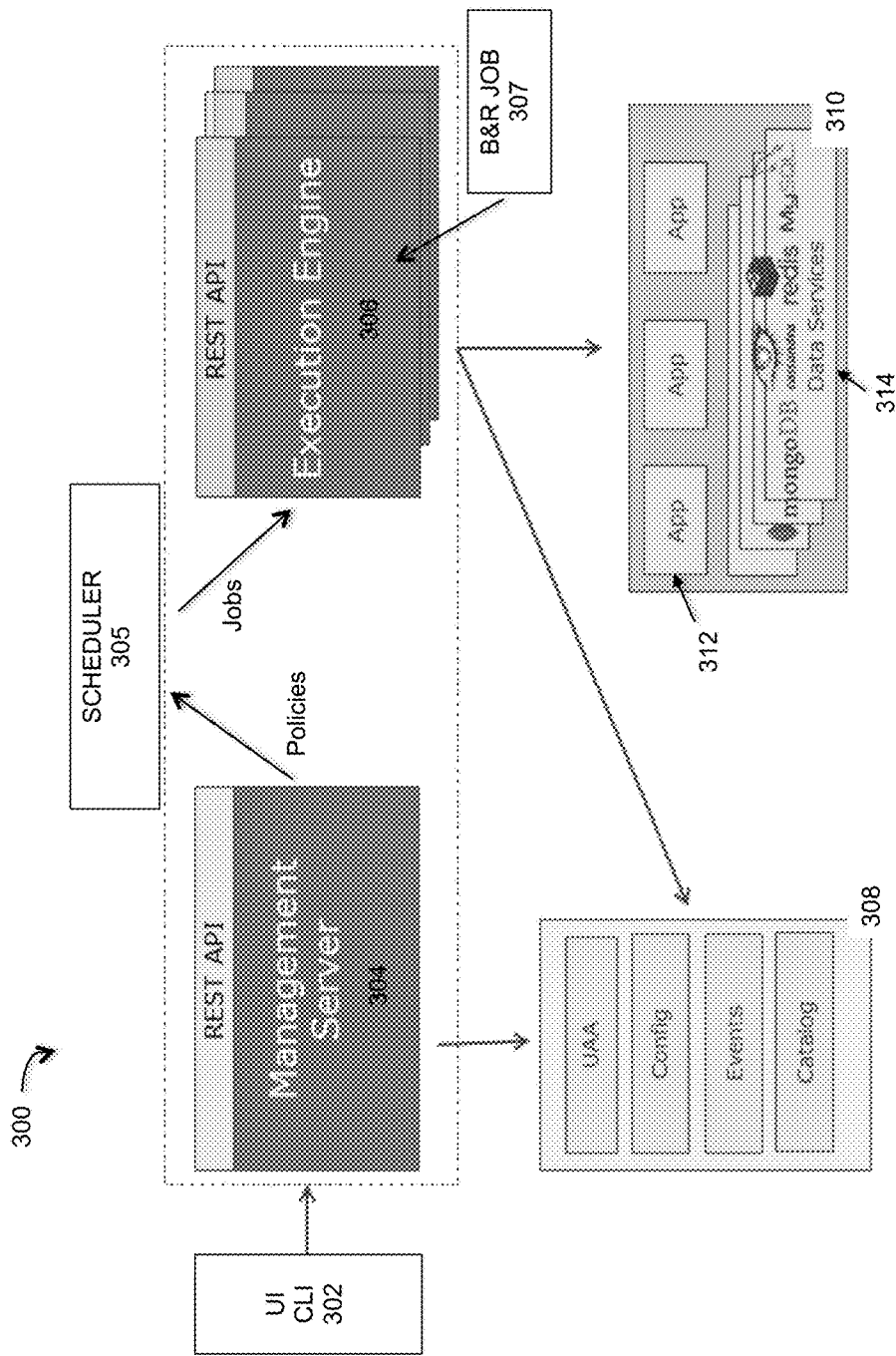
FIG. 3 illustrates a management server that implements a data service protection process on a PaaS platform, under some embodiments.

FIG. 3 illustrates a management server that implements a data service protection process on a PaaS platform, under some embodiments. As shown in system 300, a user interface (UI) or command line interface (CLI) 302 provides user input to management server 304. The management server 304 provides an API (e.g., REST API) to setup the PaaS application and data service protection. It interacts with both data persistence services 308, which may include functions such as catalog, configuration, event, and so on, and an execution engine 306 that sends requests to an execution service. The management server may implement a management service that is implemented as a PaaS application and also registered with the PaaS through an implementing service broker API The REST (representational state transfer) API covers certain functionalities, such as UAA (user account and authentication) integration. The REST API expects a valid UAA access token and will only allow access the resource which access token is granted and scope is requested.

Through the API, the management server 304 performs the application discovery function (e.g., step 202 of FIG. 2) on PaaS applications 312 and associated data services 314 that are in the PaaS containers 310. It discovers all PaaS application and associated data services under authorized organization and spaces depending on the PaaS technology. For the Cloud Foundry example, these would be Cloud Foundry organizations and spaces.

The management server also performs policy configurations. Such policies may be expressed in the form of a plan/plan template, which is a simplified version of policy. A plan template defines common attributes' allowable range, e.g., max RPO (maximum backup frequency), or max of data retention. A plan is a concrete instance of a plan template which include defined schedule, data retention, backup frequency and protected applications and data services. The policies are transmitted to the execution engine 306 through a scheduler 305, which issues jobs to the execution engine 306 based on the policies sent from the management server 304.

As shown in FIG. 3, the execution server 306 The execution service is responsible for the execution of backup/recovery of PaaS applications and data services. The execution service may be implemented as a scalable service through internal multiple processes scaling and multiple instance auto-scaling. For Cloud Foundry implementations, the execution service may be implemented as a standard CF application (micro service). The execution service is an internal service that only accepts requests from management service and access data persistence service for query and update. Each instance of execution service will communicate with each other through self-discovery protocol (IP multi-casting) and one of instance will be self-selected as the master instance. The master instance of execution service is responsible for scheduling/dispatching tasks to other instances to execute requested task and only master instance will process requests from management service For data protection, the execution engine executes an on-demand backup and recovery (B&R) job initiated by the management server 304 and as scheduled by the scheduler 305 in accordance to the RPO/RTO needs of the user. The B&R job performs on-demand full backup for selected applications and associated data services with specified data retention. Recovery/restore functions may be provided through a restore browse that lists available backup sets with a query filter by characteristics such as: organization, space, application, data services, etc., or an on-demand restore that restores a selected list of backup sets.

The REST API may also cover other functions such as job monitoring, which provides the status of current running jobs, and a historical jobs' detail; an event/audit function that provides interfaces to list events, where audits may be implemented as part of an event; log management, which configures log retention by size or time or log level, and log access; a reporting function, which provides storage, performance, and billing support.

As shown in FIG. 3, the data persistent services include certain functions such as configuration, catalog, and event. Certain micro services may be implemented to provide data persistence for configuration, catalog and event. The system may leverage CPS micro services (configuration/catalog/event) REST service design/specification and implementation as necessary. The underlying database store (e.g., a lightweight DB) may be implemented depending on environment requirements and time-to-market considerations.

Figure 4:
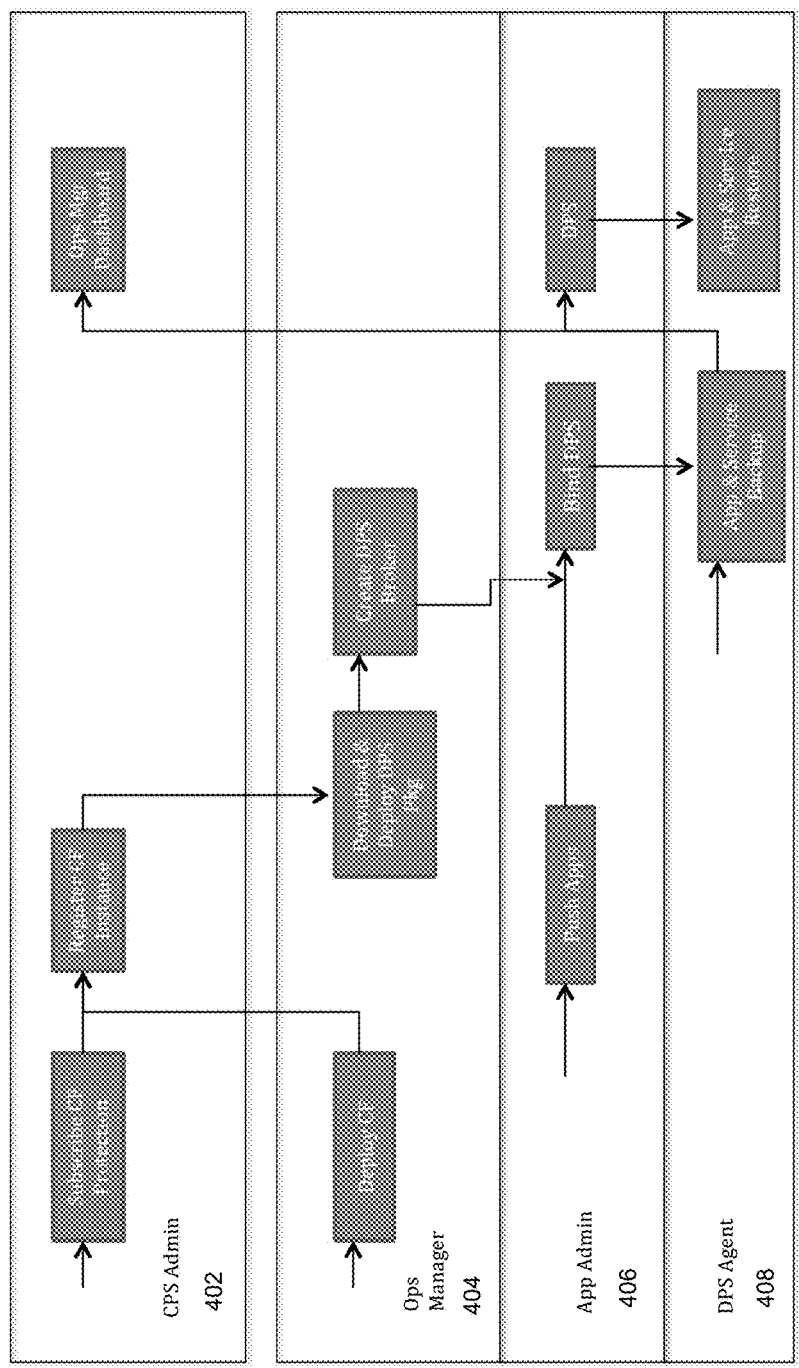
FIG. 4 illustrates an end-to-end process for a data protection service in a PaaS system, under some embodiments.

The system 300 may implement certain data source agent modules. For each different data source asset, it provides a dedicated agent (e.g., implemented as a loaded module) to perform some of functionalities like discovery, backup and recovery through well-defined common APIs. These include a Cloud Foundry agent module that is used to perform the discovery of Cloud Foundry applications and associated data services, and specific other database modules (e.g., MySQL, Redis, MongoDB, and Cassandra) that are used to perform the backup/recovery of the corresponding data services FIG. 4 illustrates an end-to-end workflow for a data protection service in a PaaS system, under some embodiments. As shown in FIG. 4, the CPS actor comprises a CPS administrator 402 that subscribes to the PaaS (e.g., Cloud Foundry, CF) protection service. The PaaS actors comprises an operations manager 404, an application administrator 406, and a DPS agent 408. The operations manager deploys the PaaS platform (e.g., CF) which is registered in the CPS after subscription by the CPS administrator 402. The operations manager then downloads and deploys a DPS package and creates a DPS broker. In the meantime, the application administrator 406 pushes applications to the PaaS platform. Once the DPS broker is created by the operations manager, it is bound to the application by the application administrator. The DPS agent 408 then performs the application and data service backup processes in accordance with the policies and schedule. The backup process is reported to the CPS administrator 402 through a management dashboard. It is also reported to the application administrator 406 though a DPS console. The DPS agent can then perform any required application and data service restore processes on that data.

Embodiments described herein basically leverage certain discovery and protection functionalities that may vary between different PaaS technologies, database technologies and underneath IaaS/host platforms to achieve equivalent functionalities provided by traditional enterprise class data protection applications. Although embodiments are primarily described with respect to a PaaS platform that may comprise a Cloud Foundry system, it should be understood that such embodiments may work with any other appropriate PaaS platform. In an embodiment, one or more libraries may be built to allow operation of the application discovery and data service association on any PaaS platform, wherein the library includes definitions that allow for the automatic identification of applications within the PaaS containers, and determination of related data services through analysis of container metadata and/or PaaS APIs. The platform-agnostic approach relies on some knowledge regarding which files to read to ascertain the identity of the applications in the container, and the subsequent metadata locations that identify the data services used by the applications. Appropriate analysis routines can be implemented to derive the associations and bindings between the applications and data services.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein.

Aspects of the methods, processes, and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Method and process steps may be executed by server or client side components that are processor-based components, programmed digital circuits, programmed arrays, and so on. Method steps may also be embodied as executable program code executed in a processor based system, such as a server computer or client computer coupled in a network. The terms, "component," "module," "procedure," "unit," and "engine" may all refer to a circuit that executes program code to perform a function implemented in software. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing data protection services and lifecycle management in a Platform as a Service (PaaS) platform having cloud-based applications and data, comprising:
   discovering an application installed on the PaaS platform using mechanisms native to the PaaS platform;
   analyzing data services used by the application and comprising one of managed services or service brokers to identify data processed by the application;
   associating the application and the identified data to exclusively apply appropriate data protection and lifecycle management processes to the identified data separately from other applications and data in the PaaS platform; and
   performing a backup/restore operation on the application and the identified data in accordance with a defined schedule.

2. The method of claim 1 wherein the discovering step uses provisioning/binding information in the service broker to obtain data access information for the application, and further comprises at least one of: using application programming interfaces (APIs) provided by the PaaS platform, and analyzing metadata associated with containers used by the PaaS platform.

3. The method of claim 2 wherein the managed services or service brokers are resident in an outer shell of the PaaS platform, and further wherein the APIs or metadata specify the data service in a hierarchical organization defining a space and application of the data service.

4. The method of claim 1 wherein the backup/restore operation is performed on at least one of: binary code of the application, metadata of the application, and data produced by the application through the data service.

5. The method of claim 4 wherein the backup/restore operation comprises a recovery operation that restores a selected list of backup data sets for the application through an on-demand process or a list selected process.

6. The method of claim 1 wherein the data service comprises a database or database management system.

7. The method of claim 1 wherein the defined schedule is defined by policies provided by a management server.

8. The method of claim 7 wherein the policies are dictated by recovery time objective (RTO) and recovery point objective (RPO) requirements of a user.

9. A system configured to provide data protection services and lifecycle management in a Platform as a Service (PaaS) platform having cloud-based applications and data, comprising:
a management server discovering an application installed on the PaaS platform using mechanisms native to the PaaS platform, analyzing data services used by the application and comprising one of managed services or service brokers to identify data processed by the application; and associating the application the identified data to exclusively apply appropriate data protection and lifecycle management processes to the identified data separately from other applications and data in the PaaS platform; and
an execution engine performing a backup/restore operation on the application and the identified data in accordance with a schedule defined by a scheduler component receiving policies from the management server.

10. The system of claim 9 wherein the management server uses provisioning/binding information in the service broker to obtain data access information for the application, and wherein the mechanisms native to the PaaS platform comprise at least one of: using application programming interfaces (APIs) provided by the PaaS platform, and analyzing metadata associated with containers used by the PaaS platform.

11. The system of claim 10 wherein the managed services or service brokers are resident in an outer shell of the PaaS platform, and further wherein the APIs or metadata specify the data service in a hierarchical organization defining a space and application of the data service.

12. The system of claim 9 wherein the backup/restore operation is performed on at least one of: binary code of the application, metadata of the application, and data produced by the application through the data service.

13. The system of claim 12 wherein the backup/restore operation comprises a recovery operation that restores a selected list of backup data sets for the application through an on-demand process or a list selected process.

14. The system of claim 9 wherein the data service comprises a database or database management system.

15. The system of claim 9 wherein the policies are dictated by recovery time objective (RTO) and recovery point objective (RPO) requirements of a user.

16. A non-transitory computer-readable medium having stored thereon a program containing executable instructions causing a processor-based computer to execute a method of providing data protection services and lifecycle management in a Platform as a Service (PaaS) platform having cloud-based applications and data, comprising:
discovering an application installed on the PaaS platform using mechanisms native to the PaaS platform;
analyzing data services used by the application and comprising one of managed services or service brokers to identify data processed by the application;
associating the application and the identified data to exclusively apply appropriate data protection and lifecycle management processes to the identified data separately from other applications and data in the PaaS platform; and
performing a backup/restore operation on the application and the identified data in accordance with a defined schedule.

17. The computer-readable medium of claim 16 wherein the method further comprises using provisioning/binding information in the service broker to obtain data access information for the application, and the discovering step comprises at least one of: using application programming interfaces (APIs) provided by the PaaS platform, and analyzing metadata associated with containers used by the PaaS platform.

\* \* \* \* \*